(12) United States Patent
Pomerantz et al.

(10) Patent No.: US 10,783,706 B2
(45) Date of Patent: Sep. 22, 2020

(54) STEREOSCOPIC RENDERING OF VIRTUAL 3D OBJECTS

(71) Applicant: Apple Inc., Cupertino, CA (US)

(72) Inventors: Stuart M. Pomerantz, Stevenson Ranch, CA (US); Timothy K. Dashwood, Culver City, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/211,786

(22) Filed: Dec. 6, 2018

(65) Prior Publication Data

US 2019/0180504 A1    Jun. 13, 2019

Related U.S. Application Data

(60) Provisional application No. 62/598,156, filed on Dec. 13, 2017.

(51) Int. Cl.
| | | |
|---|---|---|
| *G06T 3/00* | (2006.01) | |
| *G06T 17/20* | (2006.01) | |
| *G06T 15/20* | (2011.01) | |
| *H04N 13/00* | (2018.01) | |
| *H04N 13/117* | (2018.01) | |

(52) U.S. Cl.
CPC .............. *G06T 17/20* (2013.01); *G06T 3/005* (2013.01); *G06T 15/20* (2013.01); *H04N 13/00* (2013.01); *H04N 13/117* (2018.05)

(58) Field of Classification Search
None
See application file for complete search history.

(56) References Cited

U.S. PATENT DOCUMENTS

| | | | |
|---|---|---|---|
| 10,127,632 B1 * | 11/2018 | Burke | .................. G06T 3/4038 |
| 2014/0292755 A1 | 10/2014 | Nagase et al. | |
| 2017/0078653 A1 * | 3/2017 | Bi | .......................... G06T 3/0062 |

(Continued)

OTHER PUBLICATIONS

Ardouin, Jérôme, Anatole Lécuyer, Maud Marchal, and Eric Marchand. "Stereoscopic rendering of virtual environments with wide Field-of-Views up to 360." In 2014 IEEE Virtual Reality (VR), pp. 3-8. IEEE, 2014. (Year: 2014).*

(Continued)

*Primary Examiner* — Steven Z Elbinger
(74) *Attorney, Agent, or Firm* — Thompson Hine LLP

(57) ABSTRACT

In one implementation, a method involves tessellating a surface of a 3D object by identifying vertices having 3D positions. The method transforms the 3D positions into positions for a first sphere-based projection for a left eye viewpoint and positions for a second sphere-based projection for a right eye viewpoint. Transforming the 3D positions of the vertices involves transforming the vertices based on a user orientation (i.e., camera position) and differences left and right eye viewpoints (e.g., based on interaxial distance and convergence angle). The method further renders a stereoscopic 360° rendering of the 3D object based on the first sphere-based projection for the left eye viewpoint and the second sphere-based projection for the right eye viewpoint. For example, an equirectangular representation of the first sphere-based projection can be combined with an equirectangular representation of the second sphere-based projection to provide a file defining a stereoscopic 360° image.

20 Claims, 10 Drawing Sheets

(56) References Cited

U.S. PATENT DOCUMENTS

2017/0236252 A1    8/2017  Nguyen et al.
2017/0287107 A1*  10/2017  Forutanpour ......... G06T 3/0062
2018/0308285 A1*  10/2018  Doyle .................... G06T 17/20

OTHER PUBLICATIONS

Li, Jisheng, Ziyu Wen, Sihan Li, Yikai Zhao, Bichuan Guo, and Jiangtao Wen. "Novel tile segmentation scheme for omnidirectional video." In 2016 IEEE International Conference on Image Processing (ICIP), pp. 370-374. IEEE, 2016. (Year: 2016).*

Ardouin, Jerome, et al., "Stereoscopic Rendering of Virtual Environments with Wide Field-of-Views up to 360", IEEE Virtual Reality, IEEE VR'14, Mar. 2014, Minneapolis, Minnesota, US, 2014.<hal-00924123v1>.

* cited by examiner

STEREOSCOPIC RENDERING OF VIRTUAL 3D OBJECTS

CROSS-REFERENCE TO RELATED APPLICATION

This application claims the benefit of U.S. Provisional Application Ser. No. 62/598,156 filed Dec. 13, 2017, which is incorporated herein in its entirety.

TECHNICAL FIELD

The present disclosure generally relates to systems, methods, and devices for creating and using stereoscopic renderings, and in particular, to stereoscopic 360° renderings that account for interaxial and convergence angle viewpoint differences.

BACKGROUND

360° Virtual Reality (VR) video is typically formatted in a 2:1 aspect ratio rectangle using equirectangular projections and stored as a video file. The file contains one equirectangular projection for each frame of the video. Stereoscopic 360° VR video contains two equirectangular projections for each frame. It includes one projection for each eye's perspective/viewpoint. Since stereopsis (stereoscopic depth perception) functions based on horizontal parallax shift of points in a scene, it is important that the left and right views offer slightly different points of view. This is easy to achieve in stereoscopic rendering of rectilinear computer-generated imagery (CGI) scenes by simply separating the two virtual cameras from each other on the camera's local x axis. This separation is referred to as interaxial distance, and the greater the interaxial distance, the greater the apparent stereoscopic depth in the scene. If the two virtual cameras are angled in slightly towards an intervening centerline they are 'converged' at a certain distance, and the chosen angle can be used to perceptually position objects in the scene at different stereoscopic depths.

Rendering a full 360° stereoscopic CGI scene is much more difficult because the virtual "camera" at the center of the scene cannot simply be duplicated and separated on a single axis. Additionally, unlike live VR rendering that links two virtual cameras to the headset wearer's eye positions and renders a viewport of the current position/orientation, a 360° stereoscopic video file needs to contain a complete rendering of the whole CGI scene on all video frames. In addition, the zenith and nadir should not contain stereoscopic parallax. If they do, when a user wearing a headset looks directly up or down and then rotates her head (Y axis rotation), the stereoscopic parallax will produce vertical disparity of the eyes and inevitably cause eye strain, pain, or potentially nausea.

One 360° stereoscopic rendering technique involves stitching six 90°×90° views together and then offsetting four of the views on the equator (+X, +Z, −X, −Z) and their respective local axis to create artificial interaxial separation. The +Y and −Y views are the same for both left and right eye renders. These disjointed views are stitched together using distortion near the stitch lines or superimposition blending. The results achieved by the technique are not seamless, and the six individual renders plus stitch phases are also processor intensive.

Another approach is a 'slit scan' method, where a 180° high by 1° (or smaller) view is rendered and repeated for each Y-axis rotation of 1° (or smaller) with the left and right eye virtual cameras, offset from the center of the scene on the camera's local x axis. The (360×2) slit renders are combined to produce two complete equirectangular views, one for each eye. This approach is very slow and memory intensive due to the repeated rendering that is required. The approach also does not avoid stereoscopic parallax near the poles.

It is desirable to efficiently render 3D objects stereoscopically for equirectangular video by, for example, creating equirectangular projections for each of the left eye and right eye viewpoints. It is further desirable to enable fast rendering of a stereoscopic 'camera pair' for every possible view orientation in the scene, while smoothly transitioning the zenith and nadir to monoscopic (i.e., zero parallax).

SUMMARY

Various implementations disclosed herein include devices, systems, and methods for stereoscopic 360° rendering of a three-dimensional (3D) object. One exemplary method involves tessellating any object(s) of a scene to identify vertices of the object(s). For each vertex, the method determines a new position (for each eye viewpoint) using the original spherical coordinates of the vertex along with defined interaxial and convergence parameters. The interaxial and convergence parameters can be predetermined, automatically determined, or specified by a user. The method can involve rendering only the vertices required for the one or more object(s) of the scene and can be performed in a single pass (or two passes—one for the front half and one for the back half) per eye without additional stitching. For these and other reasons, the techniques disclosed herein can be faster and/or use less memory/system resources than prior techniques.

Various implementations disclosed herein include devices, systems, and methods for stereoscopic 360° rendering of a three-dimensional (3D) object by transforming the spherical positions of vertices, which can be mapped to an equirectangular projection. In one such implementation, an exemplary method involves tessellating a surface of a 3D object by identifying vertices having 3D positions. The vertices define polygons that each approximate a respective portion of the surface of the 3D object. The method transforms the 3D positions of the vertices into positions for a first sphere-based projection for a left eye viewpoint and positions for a second sphere-based projection for a right eye viewpoint. Transforming the 3D positions of the vertices involves transforming the vertices based on a user orientation/camera position and differences between the left eye viewpoint and the right eye viewpoint. Transforming the 3D positions of the vertices can involve translating the vertices based on interaxial distance between the left eye viewpoint and the right eye viewpoint. Transforming the 3D positions of the vertices can involve rotating the vertices based on convergence angles for the left eye viewpoint and the right eye viewpoint. The method further renders a stereoscopic 360° rendering of the 3D object based on the first sphere-based projection for the left eye viewpoint and the second sphere-based projection for the right eye viewpoint. In one example, the result is two equirectangular representations for the left and right eye viewpoints respectively.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
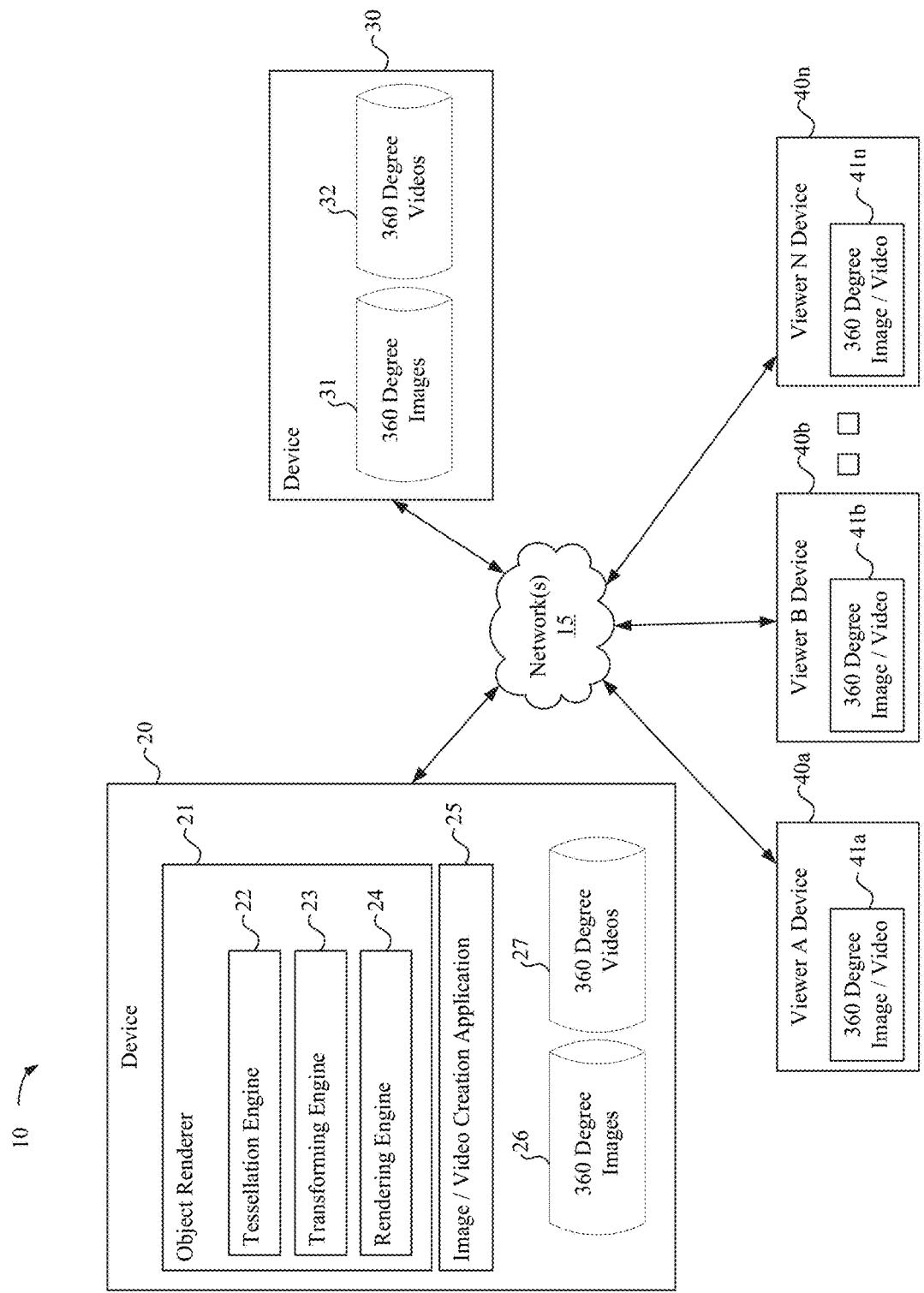
FIG. 1 is a block diagram of an example operating environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

Various implementations include devices, systems, and methods for stereoscopic 360° rendering of a three-dimensional (3D) object. One exemplary method involves tessellating the object(s) of a scene to identify vertices of the object(s). For each vertex, the method determines a new position (for each eye viewpoint) using the original spherical coordinates of the vertex and interaxial and convergence parameters. The interaxial and convergence parameters can be predetermined, automatically determined, or specified by a user. The method can involve rendering only the vertices required for the one or more object(s) of the scene and can be performed in a single pass per eye without additional stitching. For these and other reasons, the techniques disclosed herein can be faster and/or use less memory and other system resources than prior techniques.

In various implementations, differences between the projections that are created for each eye viewpoint are determined using a projection sphere, which is represented, for example, using an equirectangular representation. Thus, rather than using a camera/viewpoint projection that is the standard perspective projection, some of the implementations use a camera/viewpoint projection that is an equirectangular projection of a projection sphere. Using a projection sphere (e.g. distorted into an equirectangular mapping) rather than a projection plane provides numerous advantages. Doing so can enable faster and more accurate modifications for eye viewpoint adjustments. It can also reduce the number of separate views needed to be rendered and combined (e.g., allowing combination of two views (front/back) rather than six views (90°×90°)) to produce a complete 360° projection. Using a projection sphere (e.g., distorted into an equirectangular mapping) rather than a projection plane can also eliminate the need for stitching to combine views since the equirectangular representations of different portions of a projection sphere (e.g., front/back) can be combined easily and without distortion. Additionally, it can enable vertex adjustments that avoid creating stereoscopic parallax at the zenith and nadir, which is desirable for the reasons described above.

In various implementations, vertex position changes are determined for each eye's viewpoint using a projection sphere. The adjustments are efficient and accurate and the projection sphere maps directly to an equirectangular representation. Each point in the equirectangular representation (i.e., a map or image); thus has a corresponding point on the projection sphere. After appropriately adjusting the vertex projection positions to account for viewpoint differences for each eye viewpoint, implementations can efficiently render an output equirectangular projection plane representing the projection sphere for each eye viewpoint. Using an equirectangular representation is convenient because that format is commonly used for 360° videos and images. However, it should be noted that non-equirectangular representations of a projection sphere can alternatively be used based on the particular circumstances of an implementation. In such implementations, adjustments to the object's vertices are made relative to the projection sphere and mapped to whatever corresponding representation is used.

FIG. 1 is a block diagram of an example operating environment 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 100 includes a device 20, a device 30, and viewer devices 40a-n.

Figure 10:
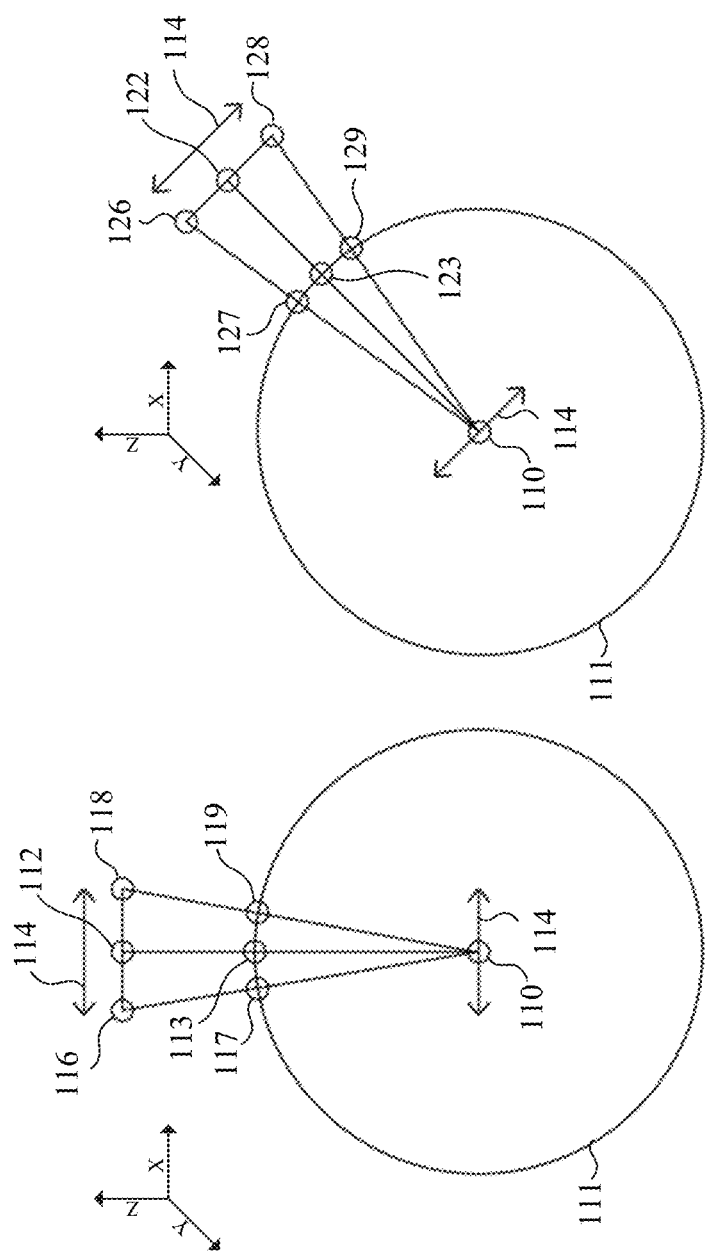
FIG. 10 illustrates translating positions of two vertices based on interaxial distance in accordance with some implementations.

In some embodiments, each of these devices, 20, 30, 40a-n includes a suitable combination of software, firmware, and/or hardware. As a non-limiting example, in some implementations each of these devices, 20, 30, 40a-n includes one or more processing units (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices, one or more communication interfaces (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces, a memory, and one or more communication buses for interconnecting these and various other components. In some implementations, the one or more communication buses include circuitry that interconnects and controls communications between system components. In some implementations, the one or more I/O devices include at least one of a keyboard, a mouse, a touchpad, a joystick, one or more microphones, one or more speakers, one or more image sensors, one or more displays, and/or the like. FIG. 10 provides additional description of components that can be utilized in each of these devices, 20, 30, 40a-n.

In some implementations, the device 10 is a user operated-device that includes an object renderer 21, an image/video creation application 25, a 360° image data store 26, and a 360° video data store 26. In this example configuration, a user is able to use the image/video creation application 25 to create 360° images and 360° videos. The image/video creation application 25 uses the object renderer 21 to render representations of 3D objects included in the 360° images and 360° videos. The object renderer 21 can be part of or separate from the image/video creation application 25. Similarly, the object renderer 21 can be local to or remote from the image/video creation application 25. The object renderer 21 can be used to provide 360° images and 360° videos for other uses in addition to content creation, and thus can provide such content to other applications in alternative implementations.

The rendering produced by the object renderer 21 can be stereoscopic or monoscopic. Moreover, a user of the image/video creation application 25 can adjust parameters (e.g., interaxial and/or convergence angle) to adjust the stereoscopic renderings that are created. In some implementations, the image/video creation application 25 is configured to receive input specifying a 3D object in 3D space (e.g., relative to x, y, z coordinates or spherical coordinates) and uses the 3D object to render equirectangular representations of the 3D object. The equirectangular representations can be the 360° images or 360° video frames that are output and distributed for consumption by viewers. In the case of stereoscopic renderings, a pair of equirectangular representations is provided for each image/video frame—one equirectangular representation for each eye.

The equirectangular representations are output and stored as the 360° images and 360° videos in the 360° image data store 26 and 360° video data store 27. These 360° images and 360° videos from the 360° image data store 26 and 360° video data store 27 can be published or otherwise distributed for viewing. For example, the 360° images and 360° videos from the 360° image data store 26 and 360° video data store 27 can be distributed to device 20 (which is an Internet content server in one implementation) and stored at 360° image data store 31 and 360° video data store 32. The 360° images and 360° videos from the 360° image data store 26, 360° video data store 27, 360° image data store 31, and/or 360° video data store 32 can be accessed, downloaded, and/or viewed on viewer devices 40a-n. For example, each viewer device 40a-n may download a 360° image/video 41a-n for viewing. In some implementations, head mounted display (HMD) having different displays for a left eye and a right eye (e.g., a VR headset) is used to view a 360° image/video 41a-n. In other implementations, viewing a 360° image/video 41a-n involves using anaglyph stereo (e.g., red/green glasses).

In some implementations, the object renderer 21 is configured to render 3D objects using a tessellation engine 22, a transforming engine 23, and a rendering engine 24. The tessellation engine 22 tessellates one or more 3D objects in a scene to determine vertices of the one or more 3D objects. Tessellation is performed using a graphics processing unit (GPU) in some implementations. An example technique for tessellation is discussed herein with respect to FIG. 4 in greater detail. The transforming engine 23 transforms the positions of the vertices using a projection sphere, user orientation information, and viewpoint difference information (e.g., interaxial distance, convergence angle, etc.) to determine vertex positions for left eye and right eye viewpoints. An example technique for transforming is discussed with respect to FIG. 5 in greater detail. The rendering engine 24 uses the final vertex positions to provide 360° renderings. For example, the rendering engine 24 may render an equirectangular representation for the left eye viewpoint and an equirectangular representation for the right eye viewpoint. An example technique for rendering is discussed herein with respect to FIGS. 5-7 in greater detail.

FIG. 1 is intended more as functional description of the various features which are present in a particular embodiment as opposed to a structural schematic of the implementations described herein. As recognized by those of ordinary skill in the art, items shown separately could be combined and some items could be separated. For example, some functional modules/engines shown separately in FIG. 1 could be implemented in a single module and the various functions of single functional blocks could be implemented by one or more functional blocks in various implementations. The actual number of modules/engines and the division of particular functions and how features are allocated among them will vary from one implementation to another and, in some implementations, depends in part on the particular combination of hardware, software, and/or firmware chosen for a particular embodiment.

Figure 2:
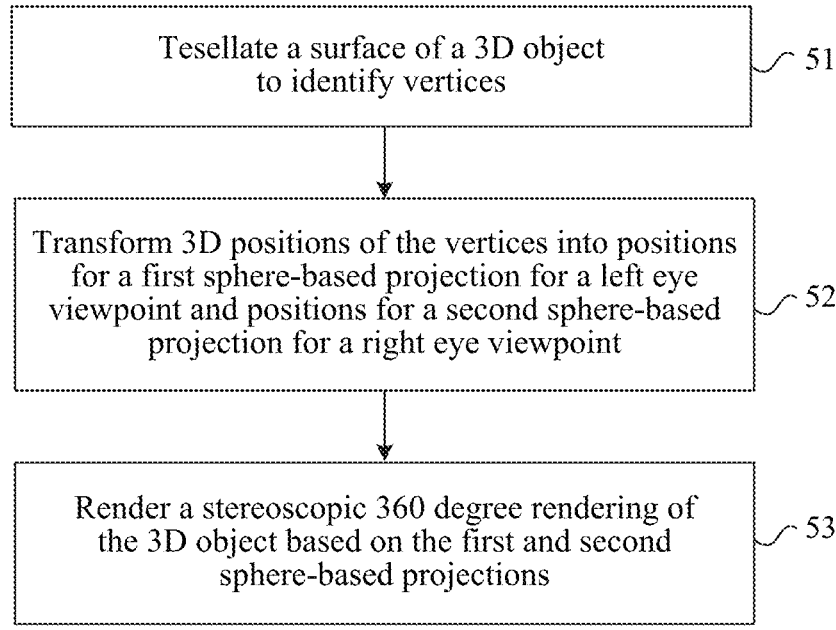
FIG. 2 is a flowchart representation of a method of stereoscopic 360° rendering of a three-dimensional (3D) object in accordance with some implementations.

FIG. 2 is a flowchart representation of a method 50 of stereoscopic 360° rendering of a three-dimensional (3D) object in accordance with some implementations. In some implementations, the method 50 is performed by a device (e.g., device 20 of FIG. 1), such as a mobile device, desktop, laptop, or server device. In various implementations, the method 50 is performed by a device with one or more processors and non-transitory memory. The method 50 can be performed on a device that has a screen for displaying 2D images and/or a screen for viewing stereoscopic images such as virtual reality (VR) display (e.g., a head-mounted display (HMD)) or an augmented reality (AR) display. In some implementations, the method 50 is performed by processing logic, including hardware, firmware, software, or a combination thereof. In some implementations, the method 50 is performed by a processor executing code stored in a non-transitory computer-readable medium (e.g., a memory).

The method 50 begins, in block 51, by tessellating a surface of a 3D object to identify vertices. The vertices define polygons that each approximate a respective portion of the surface of the 3D object. Tessellating the surface of a 3D object can be performed by a tessellating engine, such as tessellating engine 22 of FIG. 1, given appropriate tessellation parameters, e.g., specifying the amount of tessellation. In the circumstance of multiple, potentially separate, 3D objects in a scene, the surfaces of some or all of the 3D objects can be tessellated to determine the corresponding vertices. In some implementations, tessellating the surface of a 3D object involves storing a tessellated object representing the surface of the 3D object in a graphical processing unit (GPU). The method 50 can additionally or alternatively involve storing texture data of the 3D object in the GPU. The tessellated object and/or the texture data can ultimately be used by the GPU to render the 3D object.

The method 50 further involves, at block 52, transforming the 3D positions of the vertices (of the tessellated object) into positions for a first sphere-based projection for a left eye viewpoint and positions on a second sphere-based projection for a right eye viewpoint. In one implementation, the first sphere-based projection is represented by a first equirectangular representation of the projection sphere with the vertices of the object in positions for the left eye and the second sphere-based projection is represented by a second equirectangular representation of the projection sphere with the vertices of the object in positions for the right eye. In alternative implementations, non-equirectangular representations are used.

In some implementations, transforming the 3D positions of the vertices involves transforming the vertices based on a user orientation (e.g., a camera position) and a difference between the left eye viewpoint and the right eye viewpoint. This can involve translating the vertices based on an interaxial distance between the left eye viewpoint and the right eye viewpoint and/or rotating the vertices based on convergence angles for the left eye viewpoint and the right eye viewpoint. An example of translating the vertices of an object is illustrated in FIG. 10 and described below.

In some implementations, the amount of translation used to account for interaxial distance and/or the amount of rotation used to account for a convergence angle is adjusted to avoid stereoscopic parallax. Specifically, the amount of translation and/or rotation can vary for individual vertices depending upon the latitude (i.e., proximity to the top and bottom poles) of the respective vertices. In some implementations, the amount of translation and/or rotation is reduced to zero as the latitude of the vertices increases such that vertices at the equator are fully adjusted (i.e., fully translated/fully rotated) and vertices at the poles are not adjusted at all (i.e., not translated and/or not rotated).

In some implementations, transforming the 3D positions of the vertices uses multiple sphere portions, e.g., a front half and a rear half, three ⅓ portions, etc., that are combined to create a final projection sphere (e.g., represented by a single equirectangular representation) for each of the left and right eye view points. An example of transforming the 3D positions of the vertices uses multiple sphere portions is discussed herein with respect to FIGS. 3-7 in greater detail.

The method 50 further involves, at block 53, rendering a stereoscopic 360° rendering of the 3D object based on the first and second sphere-based projections. The rendered stereoscopic 360° rendering can be stored locally in memory, sent to or published to a remote server, and/or displayed on a monitor or stereoscopic viewer such as an HMD headset.

In some implementations, a user uses a creation application such as the image/video creation application 25 of FIG. 1 to create and view 360° images and videos in a real-time user interface environment. In some implementations, a user interface is configured to receive input specifying the 3D geometry of a 3D object (i.e., its 3D position in 3D space), and/or user input specifying viewpoint parameters (e.g., interaxial distance, convergence angle, etc.) and to display equirectangular projections of the 3D object (e.g., one for the left eye viewpoint and one for the right eye viewpoint) to allow the content creator to observe 360° representations of the 3D object in real-time, e.g., as the user repositions the 3D object, changes the viewpoint parameters, etc., during content creation. In some implementations, the user interface simultaneously shows three views. The first view provides an equirectangular representations of a first sphere-based projection for a left eye viewpoint, i.e., showing all 360° content for the left-eye viewpoint in a flat representation. The second view shows an equirectangular representations of a second sphere-based projection for a right eye viewpoint, i.e., showing all 360° content for the right-eye viewpoint in a separate flat representation. One or more additional views can be provided to show one or more camera facing viewpoints, i.e., showing a camera view of some of the 360° content from a particular camera facing direction, e.g., a front facing camera, a rear facing camera, a top facing camera, a camera facing a particular user-specified direction, etc. Providing one or more of these multiple views can facilitate creation of 360° images and content by providing the users more intuitive views of the content being created even without the use of a stereoscopic headset or HMD.

Figure 3:
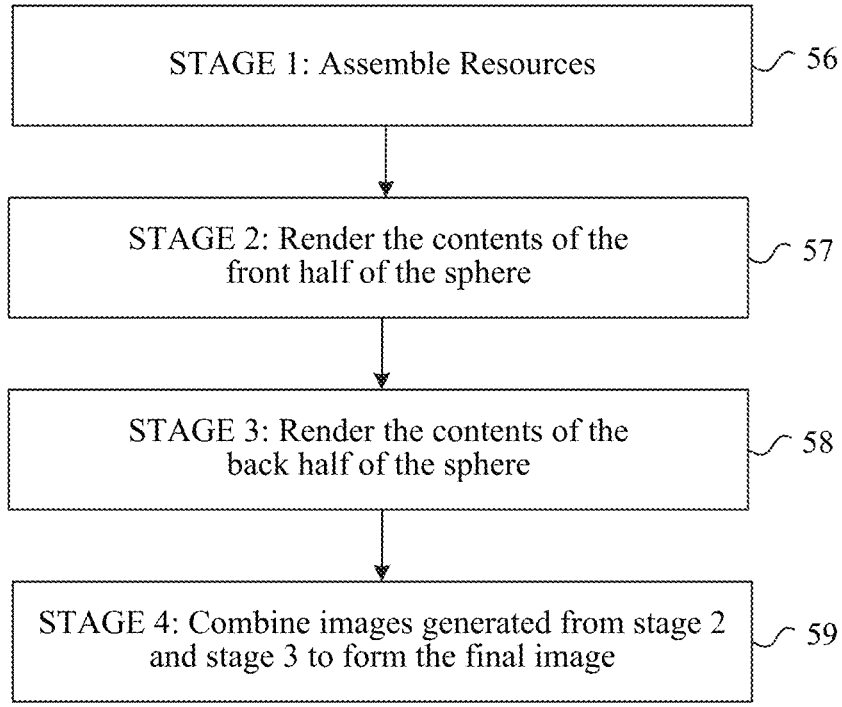
FIG. 3 is a flowchart representation of a method of stereoscopic 360° rendering of a 3D object using front half and back half renderings in accordance with some implementations.

FIG. 3 is a flowchart representation of a method 55 of stereoscopic 360° rendering of a three-dimensional (3D) object using front half and back half renderings in accordance with some implementations. In some implementations, the method 55 is performed by a device, such as a mobile device, desktop, laptop, or server device. In various implementations, the method 55 is performed by a device with one or more processors and non-transitory memory. The method 55 can be performed on a device that has a screen for displaying 2D images and/or a screen for viewing stereoscopic images such as virtual reality (VR) display (e.g., a head-mounted display (HMD)) or an augmented reality (AR) display. In some implementations, the method 55 is performed by processing logic, including hardware, firmware, software, or a combination thereof. In some implementations, the method 55 is performed by a processor executing code stored in a non-transitory computer-readable medium (e.g., a memory).

The method 55 begins, in block 56, with STAGE 1: Assemble Resources. The method 55 continues with, in block 57, STAGE 2: Render the contents of the front half of the sphere and with, in block 58, STAGE 3: Render the contents of the back half of the sphere. The method 55 continues, at block 59, with STAGE 4: Combine images generated in stage 2 and stage 3 to form the final image.

Examples of these features are discussed in greater detail herein with respect to FIGS. 4-7.

Figure 4:
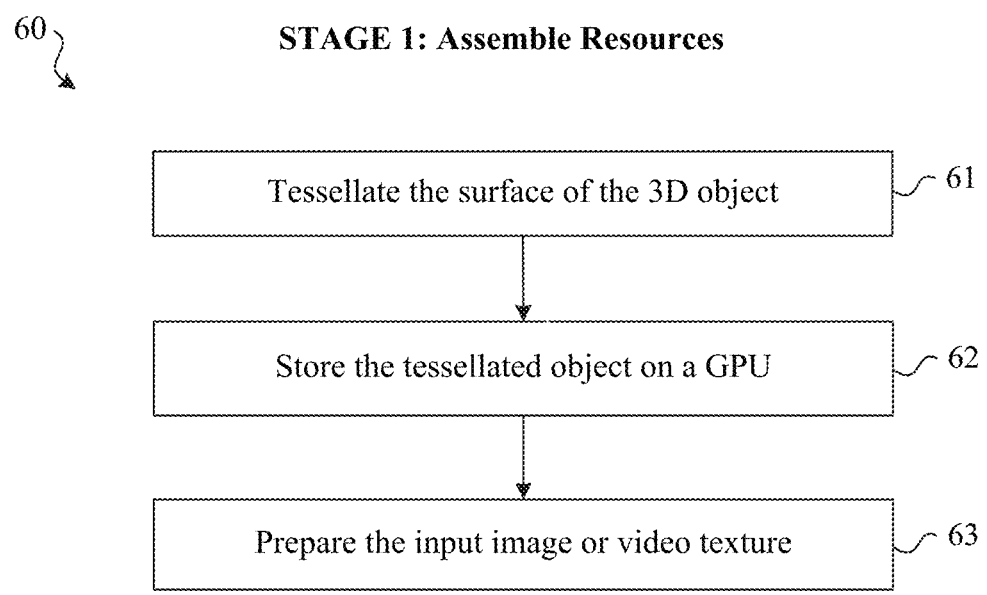
FIG. 4 is a flowchart representation of exemplary steps of STAGE 1, assemble resources, of FIG. 3 in accordance with some implementations.

FIG. 4 is a flowchart representation of a method 60 involving example steps for implementing STAGE 1, assemble resources, of FIG. 3 in accordance with some implementations. The method 60 begins, in block 61, by tessellating the surface of the 3D object. Tessellation involves breaking the surface of an object up into sub-surfaces, e.g., a rectangle can be broken into sub-rectangles or other sub-polygonal shapes. In one implementation, tessellating the surface of the 3D object involves determining a 3D mesh of points (i.e., vertices) that define triangles, quadrilaterals, or other polygons that approximate the surface of the object.

Some implementations use particular system/configuration attributes to ensure that the tessellation is performed efficiently while also avoiding the introduction of artifacts. The characteristics of the tessellation/tessellation parameters can be selected to account for the ultimate use of the vertices. Specifically, the amount of tessellation and/or whether the tessellation is adaptive can be selected based on the circumstances of the implementation. In particular, a representation of the 3D object will ultimately be created using the vertices of the mesh. Conventional systems determine a limited view of an object (e.g., a front facing camera view) by projecting a mesh onto an imaging plane (e.g., a camera plane) for a particular camera direction. In contrast, implementations disclosed herein will project a 3D object onto an entire sphere, i.e., a projection sphere. Thus, rather than using a single imaging plane representing a portion of a view, implementations use a projection sphere (e.g., represented by an equirectangular representation) for the entire view (i.e., all directions). This can be taken into account when determining the tessellation parameters by ensuring that the tessellation is high enough to ensure that all areas are adequately tessellated to avoid inducing artifacts. However doing so can require an large number of vertices and thus decrease the overall efficiency and performance of the system. Some implementation use adaptive tessellation to reduce the overall number of vertices. Specifically, such implementations predict where, in the projection sphere, particular portions of an object will end up based on the position of the object relative to the user perspective/camera position. Generally, there will be more distortion near the poles (top and bottom) and less distortion near the equator. In some implementations, this information is used to adaptively tessellate by using a higher tessellation rate near the poles and a lower tessellation rate near the equator. Doing so provides a mesh with fewer vertices than would otherwise be required to avoid inducing artifacts. Adaptive tessellation may be particularly useful for 3D objects with large size and/or complicated shape. Accordingly, some implementations determine tessellation rates for different portions of a 3D object based on their relative locations to significantly reduce processing time, without decreasing quality.

The method 60 continues, in block 62, with storing the tessellated object on a graphical processing unit (GPU), where it can be used to render the object and/or draw images and frames. The method 60 continues, in block 63, with preparing the input image or video texture. In some implementations, this involves determining a texture value associated with each polygon of the tessellation object's mesh or each vertex of the tesselation object. At the end of STAGE 1, the system has a tessellated object and input textures stored on a GPU and ready to be used to render stereoscopic 360° renderings of one or more three-dimensional (3D) objects.

Figure 5:
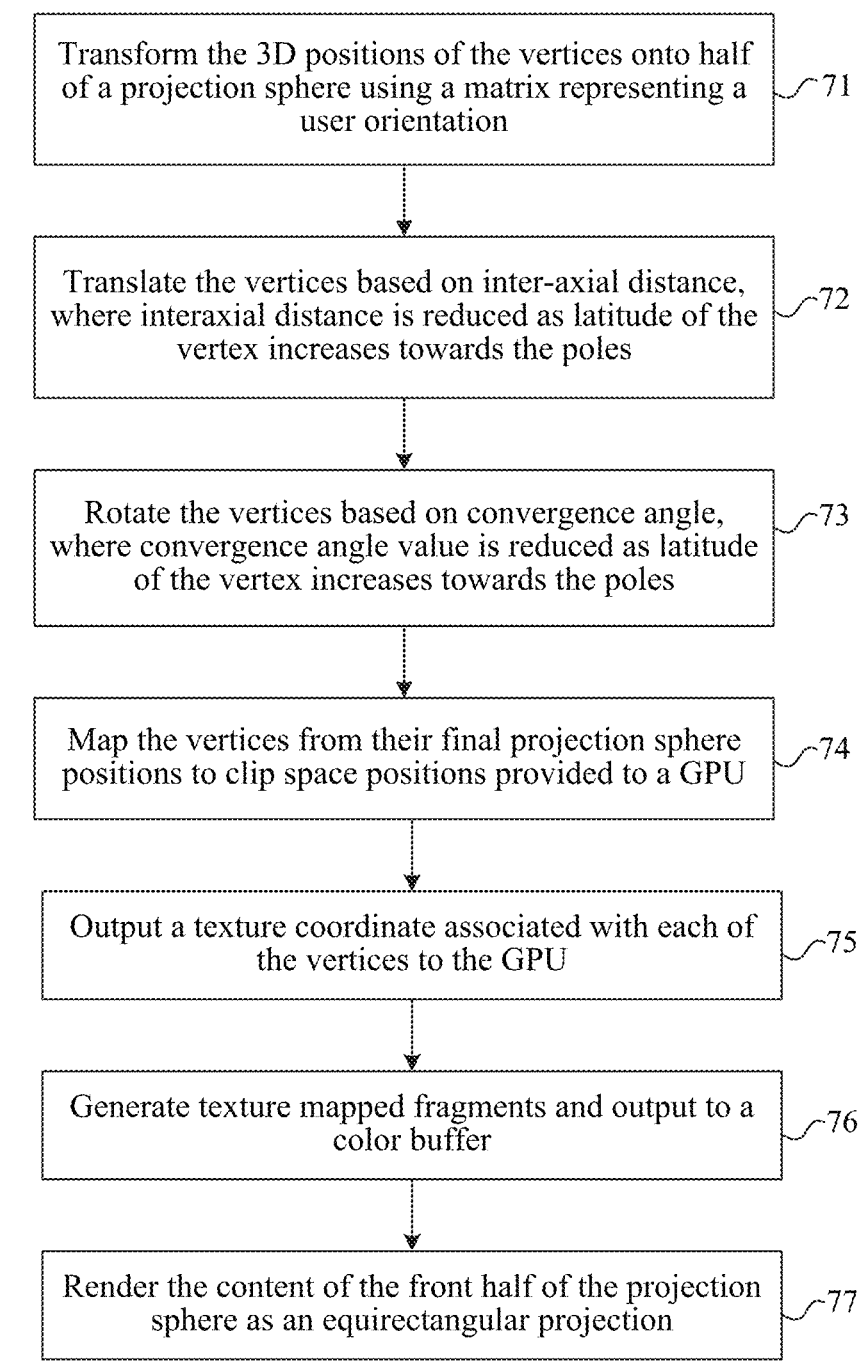
FIG. 5 is a flowchart representation of exemplary steps of STAGE 2, render contents of the front half of the sphere, of FIG. 3 in accordance with some implementations.

FIG. 5 is a flowchart representation of a method 70 involving example steps for implementing STAGE 2: render contents of the front half of the sphere, of FIG. 3 in accordance with some implementations. The method 70 begins, in block 71, by transforming the 3D positions of the vertices onto half of a projection sphere using a matrix. The matrix represents a user orientation/camera position and thus transforms the positions of the vertices based on that particular user orientation/camera position. In one implementation, this transforming involves identifying a projection sphere (e.g., an equirectangular representation of a projection sphere) that represents all of the vertices appearing on the front half of the projection sphere. Additional steps of method 70 adjust this initial positions of the vertices to account for each of the eye viewpoints—resulting in one projection of an object's vertices for the left eye viewpoint and one projection of the object's vertices for the right eye viewpoint.

The method 70 continues, in block 72, by translating the vertices based on an interaxial distance. The interaxial distance is reduced as latitude of the vertex increases towards the poles. In other words, vertices near the poles are translated less based on using a lower interaxial distance to determine how much to translate the vertices near the poles.

The translation of the vertices can depend on an interaxial distance specified by a user. The interaxial distance represents a distance between a left eye viewpoint and a right eye viewpoint at/near the center of a projection sphere. For any individual vertex, some implementations determine where the vertex is (e.g., latitude, longitude, spherical coordinates, etc.). These implementations then determine how to monoscopicly render the vertex (block 71), i.e., determining the position of the vertex on a projection sphere (e.g., represented by an equirectangular representation). The implementations next create eye viewpoint-specific representations. To account for interaxial separation (in block 72), for that vertex, the system will shift/translate the world a certain distance for the right eye viewpoint and a certain distance in the opposite direction for the left eye viewpoint. This is based on the direction of the vertex itself (relative to the user orientation/camera position) and the interaxial distance. FIG. 10 illustrates such a translation of vertices. The greater the interaxial distance specified by the user, the greater the vertex is translated in each of the projections. However, as noted above, in some implementations the amount of translation is reduced based on the latitude of the respective vertex, i.e., based on its proximity to one of the top or bottom poles.

The method 70 continues, in block 73, by rotating the vertices based on a convergence angle. The convergence angle is reduced as latitude of the vertex increases towards the poles. In other words, vertices near the poles are rotated less based on using lower convergence angles to determine how much to translate the vertices near the poles.

The rotation of the vertices can depend on a convergence angle specified by a user. The convergence angle represents an angle associated with the left eye viewpoint and the right eye viewpoint that cause the viewpoints to converge at a distance. For any individual vertex, some implementations adjust eye viewpoint-specific representations. To account for the convergence angle, for that vertex, the implementations rotate the world a certain distance for the right eye viewpoint and a certain distance in the opposite direction for the left eye viewpoint. This can be based on the direction of the vertex itself (relative to the user orientation/camera position), the stereoscopic distance of the vertex away from the user orientation/camera position, and/or the convergence angle. The greater the convergence angle, the more rotation is applied in each of the eye projection spheres. However, as noted above, in some implementations, the amount of rotation is reduced based on the latitude of the respective vertex, i.e., based on its proximity to one of the top or bottom poles.

In some implementations interaxial distances and convergence values are determined automatically using a heuristic/algorithm or are animated. In some circumstances, a content creator will want to vary the amount of interaxial distance and thus stereo separation over time. For example, in some circumstances, such as for very fast moving content (e.g., action shots, fast camera moves), a content creator will want to decrease the stereo separation as camera movement or action speeds up and/or increase the stereo separation as the camera movement or action slows down. In some implementations, the amount of stereo separation is adjusted over time manually. In other implementations the amount of stereo separation is adjusted over time automatically. In some implementations, the amount of stereo separation is automatically adjusted based on optical flow information, content information, and/or velocity of head movement. Optical flow information, for example, can be used to identify high activity level or fast moving content, and the amount of stereo separation can be automatically adjusted accordingly. These techniques can be particularly useful in the context of interactive games, virtual reality (VR) and augmented reality (AR) applications.

The method 70 continues, in block 74, by mapping the vertices from their final projection sphere positions to a clip space positions. In some implementations, the vertices are mapped from their final spherical positions (i.e., on a projection sphere) to clip space positions (e.g., on an equirectangular representation) and fed to a graphical processing unit (GPU) processing pipeline. The GPU pipeline will ultimately map pixels generated to their equirectangular output positions.

The method 70 continues, in block 75, by outputting a texture coordinate associated with each of the vertices. In some implementations, the texture coordinate is output to the GPU. The method 70 continues, in block 76, by generating texture mapped fragments and outputting the fragments to a color buffer. The method 70 continues, in block 77, by rendering the content of the front half of the projection sphere as an equirectangular projection. The vertex positions and the texture mapped fragments are used to render the contents.

Figure 6:
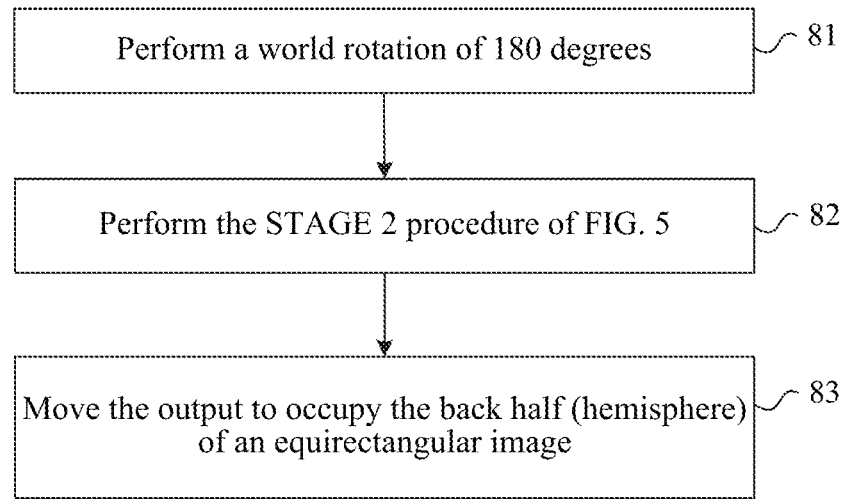
FIG. 6 is a flowchart representation of exemplary steps of STAGE 3, render contents of the back half of the sphere, of FIG. 3 in accordance with some implementations

FIG. 6 is a flowchart representation of a method 80 involving example steps for implementing STAGE 3, render contents of the back half of the sphere, of FIG. 3 in accordance with some implementations. The method 80 begins, in block 81, by performing a world rotation of 180°. This allows the same processes used in STAGE 2 (FIG. 5) to be reused. Thus, the method 80 continues, in block 82, by performing the STAGE 2 procedure of FIG. 5. Because of the world rotation, the procedure results in a rendering of the contents of the back half of the projection sphere. The method 80 continues, in block 83, by moving the output to occupy the back half on an equirectangular image.

Thus, after STAGE 2 (FIG. 5) an equirectangular representation of the front half of the projection sphere has been generated and after STAGE 3 (FIG. 6) an equirectangular representation of the back half of the projection sphere has been generated.

Figure 7:
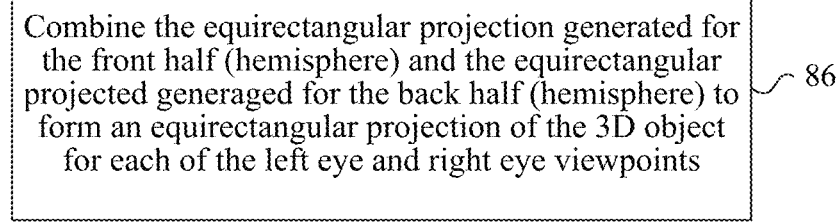
FIG. 7 is a flowchart representation of exemplary steps of STAGE 4, that combines images generated from stage 2 and stage 3 to form the final image, of FIG. 3 in accordance with some implementations.

FIG. 7 is a flowchart representation of a method 85 involving example steps for implementing STAGE 4, to combine images generated from STAGE 2 and STAGE 3 to form the final image, of FIG. 3 in accordance with some implementations. In method 85, at block 86, the system combines the equirectangular projection generated for the front half and the equirectangular projection generated for the back half to form an equirectangular projection of the 3D object. A combined equirectangular projection is generated for each eye viewpoint. Thus, for a left eye viewpoint, a front half equirectangular projection is combined with a back half equirectangular projection. Similarly, for the right eye viewpoint, a different front half equirectangular projection is combined with a different back half equirectangular projection. The result is two combined equirectangular representations—one for each of the left eye viewpoint and the right eye viewpoint.

In the example of FIGS. 3-7, front and rear projections are combined. In another implementation, a single projection is generated. In other implementations, three or more projections are generated and combined. For example, the 360° viewable area can be broken up into thirds (120° each) and combined to form the 360° equirectangular projections. Using more portions (e.g., using a front portion and a back portion as opposed to a single portion that includes both) can provide advantages. Using a front portion and back portion can reduce the amount of tessellation needed. If a single portion is used, the tessellation rate required to avoid inducing artifacts may need to be extremely high and thus result in decreased efficiency or performance. This is because rendering the entire portion in a single pass would require extremely high tessellation in the pole regions, i.e., in the upper right hand corner, the upper left hand corner, and the lower two corners. The tessellation rate for the 3D object would have to be very high in those regions but would not need to be nearly as high in the portion of the projection sphere corresponding to the middle third of the image. Rendering in two halves (or using 2 or more portions) can thus improve efficiency and performance and indeed may make processing feasible that would otherwise be computationally prohibitive. Conversely, each additional portion (e.g., using two portion, three portions, four portions, etc.) increases the number of renderings required and thus also can reduce efficiency and performance. Some implementations select a number of portions (e.g., selecting two portions—front and back) to balance the benefits of reduced tessellation with the benefits of fewer portion-specific renderings.

Figure 8:
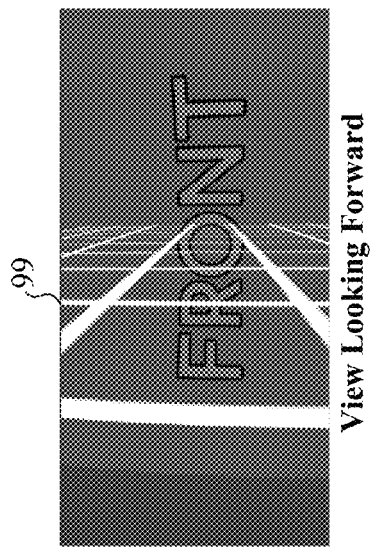
FIG. 8 illustrates a monoscopic rendering of an object in 3D space in accordance with some implementations.
Figure 8:
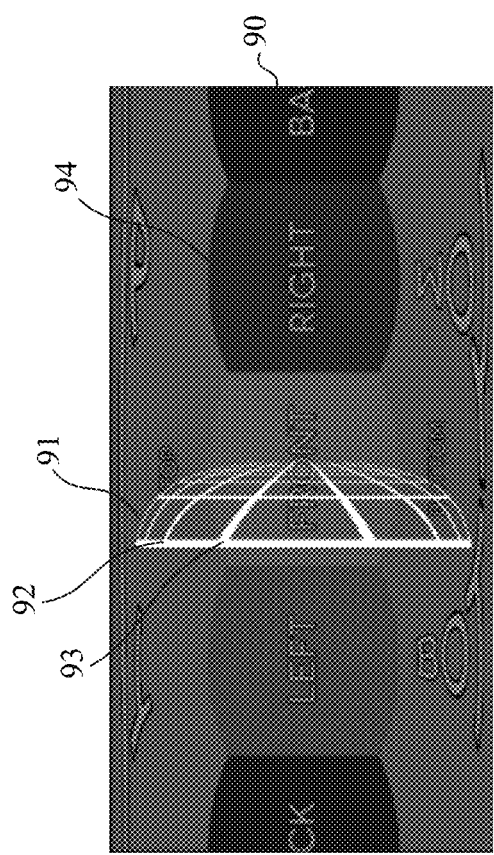

FIG. 8 illustrates a monoscopic rendering of an object in 3D space in accordance with some implementations. In this example, the equirectangular representation 90 includes a graphical underlay 94 that illustrates which side (front, right, left, back, top, bottom) of a six-sided cube corresponds to the associated portion of the representation 90. The graphical underlay 94 is provided for illustrative purposes and is not used in determining the positions of the vertices of the object 91 in the representations. However, it should be noted that a user interface that presents the equirectangular representations may or may not include such a graphical underlay 94 to provide reference to the user. A user, in some implementations, is able to toggle the graphical underlay 94 on and off to suit his/her development requirements.

In this example of FIG. 8, the 3D object is a plane shown as object 91 in the equirectangular representation 90. For this monoscopic rendering, the same equirectangular projection is viewed by both eyes, i.e., there are not separate and different equirectangular projections for each eye. The positions of the vertices (and thus the resulting equirectangular representations 90) can be determined using one or more of the techniques disclosed herein. In some implementations, vertices for monoscopic representations such as this are determined by using an interaxial distance of zero and a convergence angle of zero.

View 99 shows a view of the object from a single camera direction (e.g., with the camera view looking forward). A user interface of a content creation application can display the equirectangular representation 90 and/or one or more the camera views of an object, such as front camera view 99, simultaneously to allow the user to accurately visualize the placement of the object in 3D space. Moreover, the equirectangular representation 90 and/or one or more the camera views of an object, can be updated in real time, for example, as the user repositions the object in 3D space using the user interface.

Figure 9:
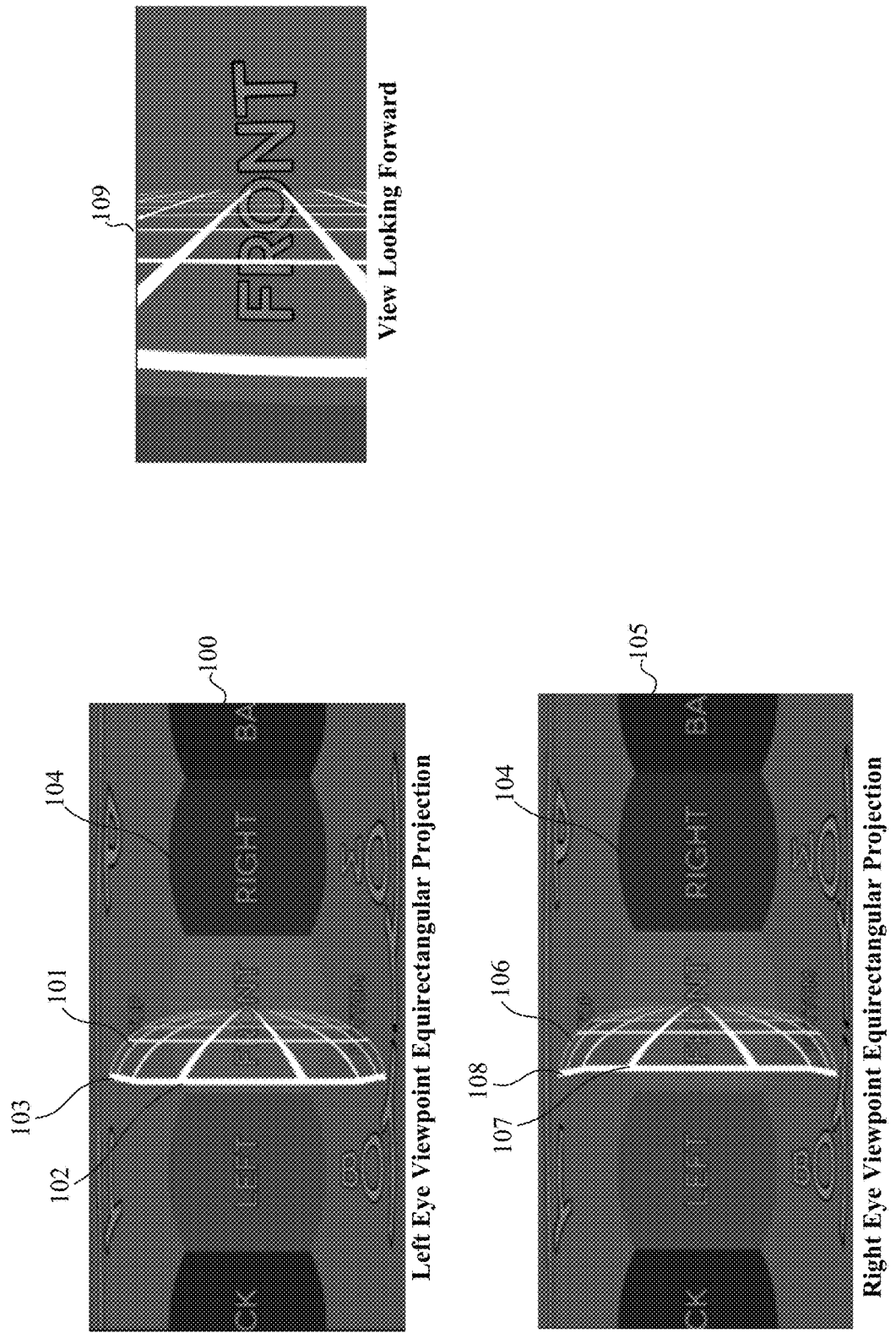
FIG. 9 illustrates a stereoscopic rendering of an object in 3D space in accordance with some implementations.

FIG. 9 illustrates a stereoscopic rendering of an object in 3D space in accordance with some implementations. Contrasting FIG. 9 with FIG. 8 illustrates the differences between monoscopic and stereoscopic rendering according to some implementations. In this example, the left eye equirectangular representation 100 and the right eye equirectangular representation 105 are different. For reference, the equirectangular representations 100, 105 include a graphical underlay 104 that illustrates which side (front, right, left, back, top, bottom) of a six-sided cube corresponds to the associated portion of the representation. The graphical underlay 104 is provided for illustrative purposes and is not used in determining the positions of the vertices of the object 101, 106 in the representations 100, 105. However, it should be noted that a user interface that presents the equirectangular representations may or may not include such a graphical underlay 104 to provide reference to the user. A user, in some implementations, is able to toggle the graphical underlay 104 on and off to suit his/her development requirements.

In this example of FIG. 9, the 3D object is a plane shown as object 101 in the left eye equirectangular representation 100 and as object 106 in the right eye equirectangular representation 105. The objects 101, 106 are positioned in different positions (e.g., relative to the graphical underlay 104) and have different shapes. For example, the vertices of the objects 101, 106 are different. For example, vertex 102 is in a different relative position than vertex 107.

FIG. 9 also illustrates how the adjustments are implemented to avoid stereoscopic parallax. The translations and/or rotations of vertices are reduced near the poles to provide more monoscopic-like renderings near the poles. Thus, vertex 103 is in a similar relative position as vertex 108. Vertices 103, 108 are moved less than vertices 102, 107 because the latitudes of these vertices 103, 107 is greater than the latitude of vertices 102, 107. Vertices 103, 108 may not even be moved if they are close enough to one of the poles.

The positions of the vertices (and thus the resulting equirectangular representations 100, 105) can be determined using one or more of the techniques disclosed herein. In some implementations, vertices for stereoscopic representations such as these are determined by using an interaxial distance and a convergence angle provided as input by a user. Examples of specific techniques for adjusting vertices are described herein, for example, with respect to FIGS. 2-7.

View 109 shows a view of the object from a single camera direction (e.g., with the camera view looking forward). A user interface of a content creation application can display the equirectangular representations 100, 105 and/or one or more the camera views of an object, such as front camera view 109, simultaneously to allow the user to accurately visualize the placement of the object in 3D space. Moreover, the equirectangular representations 100, 105 and/or one or more the camera views of an object, can be updated in real time, for example, as the user repositions the object in 3D space using the user interface.

In one implementation, a user provides input via a user interface to change an interaxial distance and/or a convergence angle and is able to view the respective equirectangular projections for the left eye and right eye viewpoints as they change in real time. As the user reduces the interaxial distance and the convergence angle down (e.g., by changing numeric parameters) to zero, the view changes to render monoscopic rather than stereoscopic. As the user then begins to increase the inter-axial distance, the user interface changes in real time to display shifting/translation of the object. In the left eye equirectangular representation 100, the object 101 shifts to the left. Similarly (and at the same time), in the right eye equirectangular representation 105, the object 106 shifts to the right. The shifting is also based on true depth. Thus, the vertices that are further away from that user viewpoint/camera position do not shift as much. And, as described above, vertices near either of the poles do not shift as much as those near the equator.

It should be noted that the techniques disclosed herein provide superior 360° renderings for both monoscopic and stereoscopic renderings of 3D objects. The disclosed techniques enable fast and efficient rendering of a 3D object for either rendering type and can provide such renderings in real time, for example, for use in displaying renderings during manipulations of a 3D object in a content creation application. The disclosed techniques can additionally be used to efficiently render backgrounds in video and other electronic content, for example, by rendering such backgrounds at 90 frames per second or faster. The techniques can also be used to render hybrid content. For example, the disclosed techniques could be used to create a file that includes 360° content for most of a scene and the remainder of the scene could be generated on the fly. As a specific example, most of a scene can be predetermined in such a file and characters can be generated on the fly and inserted into the scene. Techniques disclosed herein can additionally be used to facilitate live broadcasts. For example, techniques can be used to generate a 360° video pipeline of a live event, such as a sporting event, and the techniques disclosed herein could be used to insert stereographic 360° overlays. Because techniques disclosed herein can be performed in real time, the overlays can be generated and added in real time.

FIG. 10 illustrates translating positions of two vertices 112, 122 based on interaxial distance 114 according to some implementations. FIG. 10 illustrates XZ plane cross sections of a 3D environment. In this example, a user orientation/camera position 110, an interaxial distance 114, and a projection sphere 111 are used to determine both monolithic and stereoscopic positions for sphere-based projections of the two exemplary vertices 112, 122.

For a monoscopic rendering, a sphere-based position 113 on the projection sphere 111 is determined for vertex 112 by determining the position on the projection sphere 111 between the user orientation/camera position 110 and the vertex 112 position in 3D space. Similarly, a sphere-based position 123 on the projection sphere 111 is determined for vertex 122 by determining the position on the projection sphere 111 between the user orientation/camera position 110 and the vertex 122 position in 3D space.

For the stereoscopic renderings (left eye and right eye), adjusted positions of the vertices 112, 122 are determined. The position of vertex 112 is translated on the XZ plane based on its longitude and then projected onto the projection sphere 111. Specifically, based on the interaxial distance 114, the vector position of vertex 112 is translated perpendicular to its longitude. The amount of translation is based on the amount of interaxial distance 114. In this example, vertex 112 is repositioned to position 116 for a left eye rendering using half of the interaxial distance 114. Vertex 112 is similarly repositioned to a position 118 for a right eye rendering using half of the interaxial distance 114. The left eye vertex position 116 and right eye vertex position 118 are translated in opposite directions and perpendicular to the longitudinal direction from the user orientation/camera position 110 to the vertex 112. The left eye vertex position 116 and right eye vertex position 118 are then used to determine sphere-based projection positions 117, 119. The left eye sphere-based projection position 117 is determined by determining the position on the projection sphere 111 between the user orientation/camera position 110 and the left eye vertex position 116. Similarly, the right eye sphere-based projection position 119 is determined by determining the position on the projection sphere 111 between the user orientation/camera position 110 and the right eye vertex position 118.

The position of vertex 122 is similarly translated on the XZ plane based on its longitude and then projected onto the projection sphere 111. In this example, vertex 122 is repositioned to position 126 for a left eye rendering using half of the interaxial distance 114. Vertex 122 is similarly repositioned to a position 128 for a right eye rendering using half of the interaxial distance 114. The left eye vertex position 126 and right eye vertex position 128 are translated in opposite directions and perpendicular to the longitudinal direction from the user orientation/camera position 110 to the vertex 122. The left eye vertex position 126 and right eye vertex position 128 are then used to determine sphere-based projection positions 127, 129. The left eye sphere-based projection position 127 is determined by determining the position on the projection sphere 111 between the user orientation/camera position 110 and the left eye vertex position 126. Similarly, the right eye sphere-based projection position 129 is determined by determining the position on the projection sphere 111 between the user orientation/camera position 110 and the right eye vertex position 128.

Figure 11:
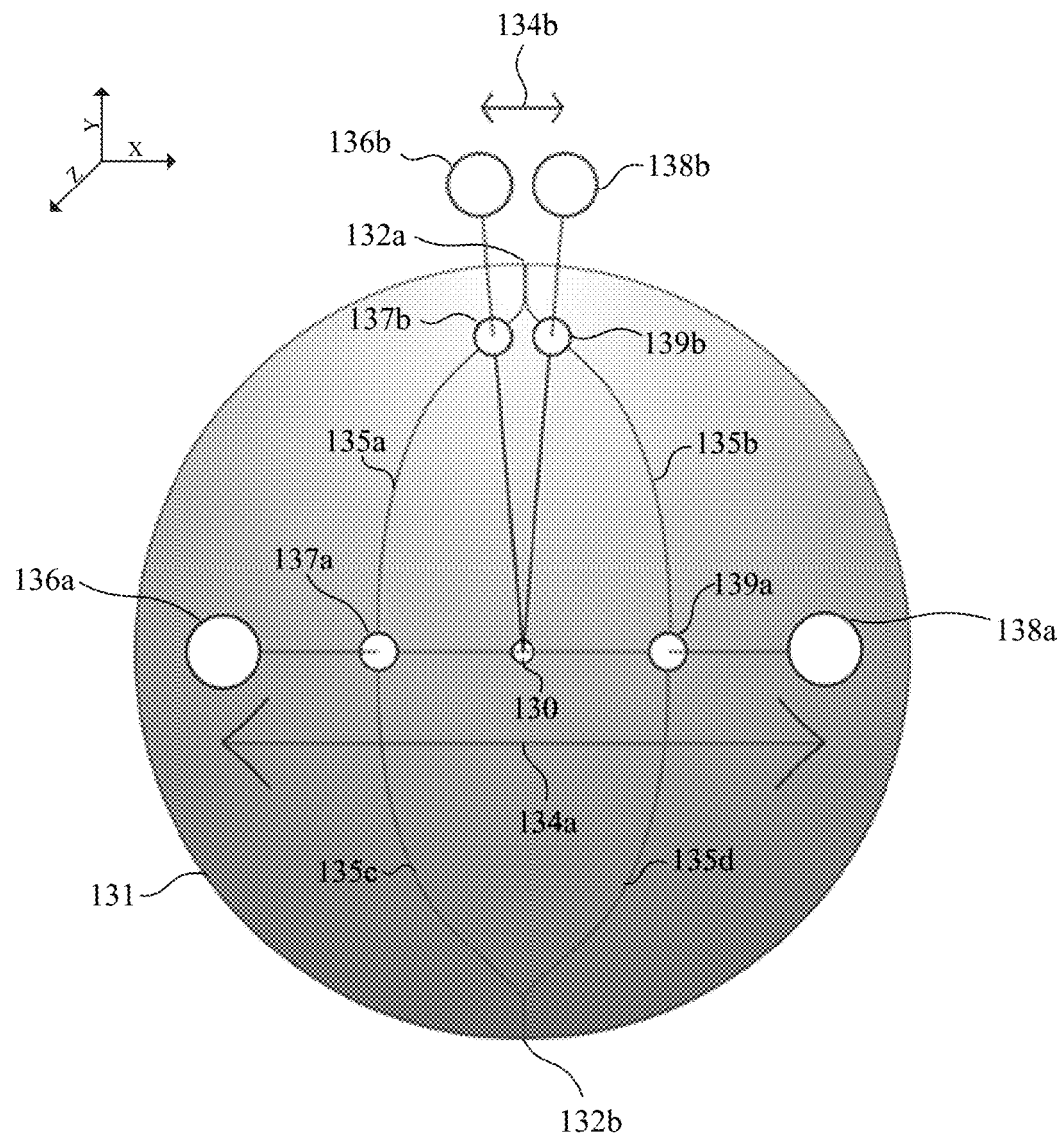
FIG. 11 illustrates translating positions of a vertex based on interaxial distance that is reduced as the latitude increases from the equator or as the proximity is closer to one of the poles in accordance with some implementations.

FIG. 11 illustrates translating positions of a vertex based on interaxial distance that is reduced as the latitude increases from the equator or as the proximity is closer to one of the poles in accordance with some implementations. For the stereoscopic renderings (left eye and right eye), adjusted positions of the vertex are determined based on a user orientation/camera position 130. For a first position of the vertex (i.e., on the equatorial XZ plane of the projection sphere 131), a first left eye position 136a and a first right eye position 138a are determined. To determine each, the position of the vertex is translated on the XZ plane based on its longitude and then projected onto the projection sphere 131. Specifically, based on the interaxial distance 134a, the vector position of vertex is translated perpendicular to its longitude. The amount of translation is based on the amount of interaxial distance 134a. In this example, the vertex is repositioned to position 136a for a left eye rendering using half of the interaxial distance 134a. The vertex is similarly repositioned to a position 138a for a right eye rendering using half of the interaxial distance 134a. The first left eye vertex position 136a and first right eye vertex position 138a are translated in opposite directions and perpendicular to the longitudinal direction from the user orientation/camera position 130 to the vertex. The first left eye vertex position 136a and the first right eye vertex position 138a are then used to determine sphere-based projection positions 137a, 139a. The first left eye sphere-based projection position 137a is determined by determining the position on the projection sphere 131 between the user orientation/camera position 130 and the first left eye vertex position 136a. Similarly, the first right eye sphere-based projection position 139a is determined by determining the position on the projection sphere 131 between the user orientation/camera position 110 and the first right eye vertex position 138a.

FIG. 11 further illustrates reducing the interaxial separation used in the translation of the vertex as the latitude of the vertex increases (i.e., as the vertex is in various positions that are closer to the poles 132a, 132b). As the latitude of the vertex increases away from the equatorial XZ plane in Y direction, the interaxial distance used in translating the vertex for projection is reduced. For example, for a second position of the vertex (i.e., above the equatorial XZ plane of the projection sphere 131 and closer to pole 132a), a second left eye position 136b and a second right eye position 138b are determined using a reduced interaxial distance 134b. To determine each, the position of vertex is translated on its respective XZ plane based on its longitude and then projected onto the projection sphere 131. Specifically, based on the interaxial distance 134b, the vector position of vertex is translated perpendicular to its longitude. The amount of translation is based on the amount of interaxial distance 134b, rather than the full interaxial distance 134a. In this example, the vertex is repositioned to position 136b for a left eye rendering using half of the interaxial distance 134b. The vertex is similarly repositioned to a position 138b for a right eye rendering using half of the interaxial distance 134b, rather than the full interaxial distance 134a. The first left eye vertex position 136a and first right eye vertex position 138a are translated in opposite directions and perpendicular to the longitudinal direction from the user orientation/camera position 130 to the vertex. The second left eye vertex position 136b and the second right eye vertex position 138b are then used to determine sphere-based projection positions 137b, 139b. The second left eye sphere-based projection position 137b is determined by determining the position on the projection sphere 131 between the user orientation/camera position 130 and the second left eye vertex position 136b. Similarly, the second right eye sphere-based projection position 139b is determined by determining the position on the projection sphere 131 between the user orientation/camera position 110 and the second right eye vertex position 138b.

The lines 135a-b on the projection sphere 131 indicate the projected path/positions of the sphere-based projections of the vertex with interaxial transitioning (linearly or with ease-in/out) based on the latitude of the vertex. In this example, the interaxial distance transitions to zero as latitude increases. In this example, the interaxial distance transitions approximately 60° from the equatorial XZ plane to 80° from equatorial XZ plane of the projection sphere 131.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

Figure 12:
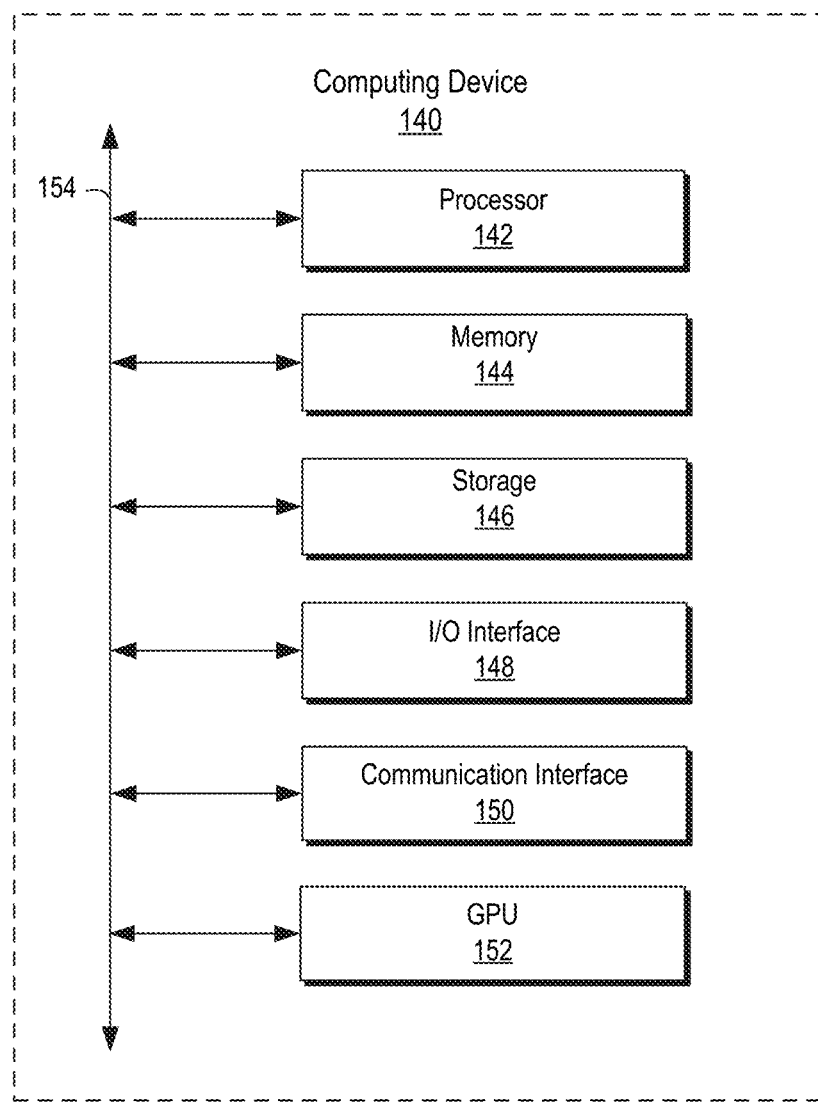
FIG. 12 is a system diagram illustrating exemplary components of a device in accordance with some implementations.

FIG. 12 is a system diagram illustrating exemplary components of the devices in described with respect to FIG. 1 and herein in accordance with some implementations. Each such device 140 may include a processor 142 that is communicatively coupled to memory 144 and storage 146 and that executes computer-executable program code and/or access information stored in the memory 144 and storage 146. The processor 142 may comprise a microprocessor, an application-specific integrated circuit ("ASIC"), a state machine, or other processing device. The processor 142 can include any of a number of processing devices, including one. Such a processor 142 can include or may be in communication with a computer-readable medium storing instructions that, when executed by the process, cause the processor to perform the operations described herein.

The memory 144 and storage 146 can include any suitable computer-readable medium. The computer-readable medium can include any electronic, optical, magnetic, or other storage device capable of providing a processor with computer-readable instructions or other program code. Non-limiting examples of a computer-readable medium include a magnetic disk, memory chip, ROM, RAM, and ASIC, a configured processor, optical storage, magnetic tape or other magnetic storage, or any other medium from which a computer processor can read instructions. The instructions may include processor-specific instructions generated by a compiler and/or an interpreter from code written in any suitable computer-programming language, including, for example, C, C++ C#, Visual Basic, Java, Python, Perl, and JavaScript.

The device 140 may also comprise a number of external or internal devices such as input or output devices. For example, the device 140 may have input/output ("I/O") interface 148 that can receive input from input devices or provide output to output devices. A bus 154 can also be included in the device 140. The bus 154 can communicatively couple one or more components of the server. The server can execute program code that configures the processor to perform one or more of the operations described above with respect to the Figures. The program code may be stored in the memory or any suitable computer-readable medium and may be executed by the processor or any other suitable processor. In additional or alternative embodiments, program code can be resident in a memory that is accessible via a data network, such as a memory accessible to a cloud service.

The device 140 can also include at least one network interface device or other communication interface 150. The communication interface 150 can include any device or group of devices suitable for establishing a wired or wireless data or telephone connection to one or more networks. Non-limiting examples of a network interface device include an Ethernet network adapter, a modem, and/or the like. A device can transmit messages as electronic or optical signals.

The device 140 can also include at least one graphics processing unit (GPU) 152. The GPU 152 can include a specialized electronic circuit designed to rapidly manipulate and alter memory to accelerate the creation of images in a frame buffer. A GPU can be present on a video card, or it can be embedded on a motherboard or—in certain CPUs—on the CPU die.

An electronic device can be a computer, telephone, mobile device, tablet, smart phone, smart watch, or any communications device. A communications device can include a processor, memory, a bus, input/output components, network interface components, and other appropriate communication components. Non-limiting examples of input devices include a touch screen (e.g., one or more cameras for imaging a touch area or pressure sensors for detecting pressure change caused by a touch), a mouse, a keyboard, or any other device that can be used to generate input events in response to physical actions by a user of a computing device, or a microphone. Non-limiting examples of output devices include an LCD screen, an external monitor, a speaker, a video file, an image file, or any other device that can be used to display or otherwise present outputs generated by a computing device. The device can execute program code that configures the processor to perform one or more of the operations described above.

Numerous specific details are set forth herein to provide a thorough understanding of the claimed subject matter. However, those skilled in the art will understand that the claimed subject matter may be practiced without these specific details. In other instances, methods apparatuses, or systems that would be known by one of ordinary skill have not been described in detail so as not to obscure claimed subject matter.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular embodiments only and is not intended to be limiting of the claims. As used in the description of the embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative embodiments but according to the full breadth permitted by patent laws. It is to be understood that the embodiments shown and described herein are only illustrative of the principles of the present invention and that various modification may be implemented by those skilled in the art without departing from the scope and spirit of the invention.

What is claimed is:

1. A method of stereoscopic 360° rendering of a three-dimensional (3D) object, the method comprising:
   at a device with one or more processors and a computer-readable storage medium:
      tessellating a surface of the 3D object by identifying vertices having 3D positions, wherein the vertices define polygons that each approximate a respective portion of the surface of the 3D object;
      transforming the 3D positions of the vertices of the surface of the 3D object into sphere-based positions for a first sphere-based projection for a left eye viewpoint and sphere-based positions for a second sphere-based projection for a right eye viewpoint, wherein transforming the 3D positions of the vertices of the surface of the 3D object comprises transforming the vertices of the surface of the 3D object into the sphere-based positions based on a user orientation and translating the 3D positions of the vertices of the surface of the 3D object based on interaxial distance between the left eye viewpoint and the right eye viewpoint; and
      rendering a stereoscopic 360° rendering of the 3D object based on the first sphere-based projection for the left eye viewpoint and the second sphere-based projection for the right eye viewpoint.

2. The method of claim 1, wherein transforming the 3D positions of the vertices of the surface of the 3D object comprises translating the 3D positions of the vertices of the surface of the 3D object in directions perpendicular to longitudinal directions from a camera position at a center of a projection sphere to the vertices of the surface of the 3D object, wherein translation of the respective vertices of the surface of the 3D object decreases as latitude of the respective vertices of the surface of the 3D object increases.

3. The method of claim 1, wherein transforming the 3D positions of the vertices of the surface of the 3D object further comprises rotating the vertices of the surface of the 3D object based on convergence angles for the left eye viewpoint and the right eye viewpoint.

4. The method of claim 3, wherein rotation of the respective vertices of the surface of the 3D object decreases as latitude of the respective vertices of the surface of the 3D object increases.

5. The method of claim 1, wherein transforming the 3D positions of the vertices of the surface of the 3D object further comprises:
   transforming the 3D positions to form a first equirectangular projection representing the first sphere-based projection; and
   transforming the 3D positions to form a second equirectangular projection representing the second sphere-based projection,
   wherein the stereoscopic 360° rendering of the 3D object comprises the first equirectangular projection and the second equirectangular projection.

6. The method of claim 1, wherein transforming the 3D positions further comprises:
   transforming the 3D positions of vertices of the surface of the 3D object adjusted for the left eye viewpoint to form a front half equirectangular projection for a front half of a projection sphere and a back half equirectangular projection for a back half of the projection sphere, and combining the front half and back half equirectangular projections to form a first combined equirectangular projection representing the first sphere-based projection; and
   transforming the 3D positions of vertices of the surface of the 3D object adjusted for the right eye viewpoint to form a front half equirectangular projection for a front half of the projection sphere and a back half equirectangular projection for the back half of the projection sphere, and combining the front half and back half equirectangular projections to form a second combined equirectangular projection representing the second sphere-based projection.

7. The method of claim 1, wherein tessellating the surface of the 3D object comprises storing a tessellated object representing the surface of the 3D object in a graphical processing unit (GPU), wherein the GPU uses the tessellated object to render the stereoscopic 360° rendering of the 3D object.

8. The method of claim 7 further comprising storing texture data of the 3D object in the GPU, wherein the GPU uses the texture data to render the stereoscopic 360° rendering of the 3D object.

9. The method of claim 1, wherein tessellating the surface of the 3D object comprises adaptive tessellation.

10. The method of claim 1 further comprising displaying the stereoscopic 360° rendering of the 3D object in a user interface of an image or video creation application, wherein the 360° rendering of the 3D object comprises equirectangular representations of the first sphere-based projection and the second sphere-based projection.

11. The method of claim 10 further comprising:
receiving input data that changes a position of the 3D object;
based upon receiving the input data, updating the rendering of the 3D object in real time to create an updated rendering of the 3D object comprising updated equirectangular representations of the first and second sphere-based projections; and
displaying the updated rendering in the user interface.

12. A system comprising:
a non-transitory computer-readable storage medium; and
one or more processors coupled to the non-transitory computer-readable storage medium, wherein non-transitory computer-readable storage medium comprises program instructions that, when executed on the one or more processors, cause the system to:
tessellate a surface of a three-dimensional (3D) object by identifying vertices having 3D positions, wherein the vertices define polygons that each approximate a respective portion of the surface of the 3D object;
transform the 3D positions of the vertices of the surface of the 3D object into sphere-based positions on equirectangular projections representing a first sphere-based projection for a left eye viewpoint and sphere-based positions for a second sphere-based projection for a right eye viewpoint, wherein transforming the 3D positions of the vertices of the surface of the 3D object into the sphere-based positions comprises:
transforming the vertices of the surface of the 3D object based on a user orientation;
translating the 3D positions of the vertices of the surface of the 3D object based on an interaxial distance between the left eye viewpoint and the right eye viewpoint; and
rotating the vertices of the surface of the 3D object based on convergence angles for the left eye viewpoint and the right eye viewpoint; and
render a stereoscopic 360° rendering of the 3D object based on the equirectangular projections.

13. The system of claim 12, wherein transforming the 3D positions of the vertices of the surface of the 3D object comprises translating the vertices of the surface of the 3D object based on the interaxial distance and determining the first sphere-based projection and the second sphere-based projection, wherein translation of the respective vertices of the surface of the 3D object decreases as latitude of the respective vertices of the surface of the 3D object increases.

14. The system of claim 12, wherein transforming the 3D positions of the vertices of the surface of the 3D object comprises rotating the vertices of the surface of the 3D object based on the convergence angles to form the first sphere-based projection and the second sphere-based projection, wherein rotation of the respective vertices of the surface of the 3D object decreases as latitude of the respective vertices of the surface of the 3D object increases.

15. The system of claim 12, wherein transforming the 3D positions further comprises:
transforming the 3D positions of vertices of the surface of the 3D object adjusted for the left eye viewpoint to form a front half equirectangular projection for a front half of a projection sphere and a back half equirectangular projection for a back half of the projection sphere, and combining the front half and back half equirectangular projections to form a first combined equirectangular projection representing the first sphere-based projection; and
transforming the 3D positions of vertices of the surface of the 3D object adjusted for the right eye viewpoint to form a front half equirectangular projection for a front half of the projection sphere and a back half equirectangular projection for the back half of the projection sphere, and combining the front half and back half equirectangular projections to form a second combined equirectangular projection representing the second sphere-based projection.

16. The system of claim 12 further comprising a graphical processing unit (GPU), wherein the GPU is configured to store a tessellated object representing the 3D object and to render the stereoscopic 360° rendering of the 3D object using the tessellated object.

17. The system of claim 16, wherein the GPU is further configured to store texture data of the 3D object and use the texture data to render the stereoscopic 360° rendering of the 3D object.

18. The system of claim 12, wherein tessellating the surface of the 3D object comprises adaptive tessellation.

19. The system of claim 12, wherein the instructions, when executed, further cause the system to display the stereoscopic 360° rendering of the 3D object in a user interface of an image or video creation application.

20. A non-transitory computer-readable storage medium, storing program instructions computer-executable on a computer to:
tessellate a surface of a three-dimensional (3D) object by identifying vertices having 3D positions, wherein the vertices define polygons that each approximate a respective portion of the surface of the 3D object;
transform the 3D positions of the vertices of the surface of the 3D object into sphere-based positions for a first sphere-based projection for a left eye viewpoint and sphere-based positions for a second sphere-based projection for a right eye viewpoint, wherein transforming the 3D positions of the vertices of the surface of the 3D object comprises transforming the vertices of the surface of the 3D object into the sphere-based positions based on a user orientation and translating the 3D positions of the vertices of the surface of the 3D object based on interaxial distance between the left eye viewpoint and the right eye viewpoint; and
render a stereoscopic 360° rendering of the 3D object based on the first sphere-based projection for the left eye viewpoint and the second sphere-based projection for the right eye viewpoint.

* * * * *